United States Patent Office 3,840,583
Patented Oct. 8, 1974

3,840,583
METHOD OF PREPARING UNSATURATED
DINITRILES
Stanley D. Turk, Bartlesville, and Charles A. Drake, Tulsa, Okla., assignors to Phillips Petroleum Company
No Drawing. Filed May 3, 1972, Ser. No. 249,864
Int. Cl. C07c 121/02
U.S. Cl. 260—465.8 R                  10 Claims

ABSTRACT OF THE DISCLOSURE

A process for the preparation of unsaturated dinitriles, which comprises contacting an olefin, an unsaturated mononitrile and a monoadduct reaction product of an olefin and an unsaturated mononitrile.

This invention relates to an improved process for the preparation of unsaturated dinitriles which comprises contacting an olefin and an unsaturated mononitrile in the presence of a monoadduct reaction product of an olefin and an unsaturated mononitrile.

Various methods of preparing unsaturated dinitriles are known in the art including the methods described by C. J. Albisetti et al. in U.S. Pat. 2,641,607 (1953) and in J. Am. Chem. Soc. 78, pp. 2637–2641 (1956). The prior art methods, including those of Albisetti, although effective in the preparation of unsaturated dinitriles, are of limited commercial value since the practice of the prior art methods frequently provides small yields of the desired unsaturated dinitrile reaction products.

It is an object of this invention to provide an improved process for the preparation of unsaturated dinitriles. Another object is to provide improved process operating conditions which result in increased yields of unsaturated dinitrile reaction products. These and other objects of the invention will be readily apparent from the description and the appended claims.

In accordance with this invention, a novel process for the preparation of unsaturated dinitriles has been found which comprises contacting an olefin and an unsaturated mononitrile with a monoadduct reaction product of an olefin and an unsaturated mononitrile.

A brief description of the inventive process and the unexpected results obtained by the practice thereof contrasted with alternative processes and correlative results is set out hereafter. The following abbreviations are used in the description of the various processes: MA represents the monoadduct reaction product which results from the reaction of isobutylene with acrylonitrile; ACN represents acrylonitrile; IB represents isobutylene; DA represents the diadduct reaction product which results from the reaction of a monoadduct reaction product and acrylonitrile.

(I) Alternative Process A:
                                              Percent
5.0 mole IB+1.0 mole ACN→0.73 mole MA,
  ultimate yield _____ 75.8
1.0 mole MA+1.0 mole ACN→0.27 mole DA,
  ultimate yield _____ 45.7
Two step combined DA, ultimate yield—
  (75.8 x 45.7) _____ 34.6

(II) Alternative Process B:
                                              Percent
1.0 mole IB+2.0 mole ACN→0.09 mole DA,
  ultimate yield _____ 9.1

(III) Inventive Process:
                                              Percent
1.5 mole IB
  +
1.0 mole ACN→0.342 mole DA, ultimate
  yield _____ 68.7
  +
1.5 mole MA As summarized by the foregoing description, the process of this invention provides significantly improved ultimate yields, e.g., 68.7 percent, of diadduct reaction product in comparison to the ultimate yields, e.g., 9.1 percent and 34.6 percent, of diadduct reaction product obtained by the practice of Alternate Process A and Alternate Process B, respectively. In the practice of Alternative Process A and Alternative Process B appreciable quantities of insoluble solid polymer by-product are formed in the reaction media. Advantageously, insoluble solid polymer by-product does not form in the practice of this inventive process.

The process of this invention can be carried out under batch reaction conditions or continuous reaction conditions. Essential to the improved diadduct reaction product yield obtained by the practice of this invention is the continuous presence of monoadduct reaction product in the reaction media and contact of monoadduct reaction product with olefin and unsaturated mononitrile during the reaction period of this invention. Accordingly, suitable reaction conditions are maintained wherein during substantially the entire reaction period monoadduct reaction product is continuously present in the reaction media. Suitable means of maintaining monoadduct reaction product in the reaction media include the continuous or intermittent addition of suitable amounts of olefin and unsaturated mononitrile to the reaction media in order to form in situ monoadduct reaction product in amounts substantially equivalent or equal to the amount of monoadduct reaction product consumed during the preparation of diadduct reaction product. Alternatively, monoadduct reaction product prepared separate from the reaction media can be added to maintain and replace any monoadduct reaction product consumed to diadduct reaction product.

Any amount of olefin, unsaturated mononitrile and monoadduct reaction product can be employed in the practice of this invention. In general, a suitable mol ratio of monoadduct reaction product to olefin varies within the range of from about 5:1 to about 0.2:1, and preferably varies from about 2:1 to about 0.5:1. In general, a suitable mol ratio of monoadduct reaction product to unsaturated mononitrile varies within the range of from about 10:1 to about 0.2:1, and preferably varies from about 5:1 to about 0.8:1.

The reaction time employed in the practice of this invention can vary widely. Generally a time period of from about a few minutes to about 48 hours and more preferably from about 1 hour to about 5 hours is an adequate period of time for olefin, unsaturated mononitrile and a monoadduct reaction product to be suitably admixed in the preparation of reaction products in high yields.

The reaction temperatures that can be employed in the practice of the invention can vary widely. Generally, however, suitable reaction temperatures are within the range of from about 100° C. to about 500° C., and preferred are within the range of from about 240° C. to about 350° C.

The reaction pressures suited to the practice of this invention also vary widely. Reaction pressures within a range of from about 0 atmospheres pressure to about 100,000 p.s.i.g. can be employed; however, reaction pressures within the range of from about 500 p.s.i.g. to about 4000 p.s.i.g. are preferably employed.

The process of this invention can be carried out in the presence of or the absence of a polymerization inhibitor. The presence of a polymerization inhibitor often advantageously limits or restricts side reactions within the reaction media such as the dimerization or polymerization of an unsaturated nitrile reactant. Accordingly, in a preferred embodiment of this invention a polymerization inhibitor is employed. Generally, the inhibitor can be employed in amounts of from about 0.001 to about 5, preferably from about 0.1 to about 1 percent by weight, based on the unsaturated mononitrile reactant. Suitable inhibitors include hydroquinone, 2,6-di-tertiarybutyl-paracresol, 2,6-di-tertiarybutyl hydroquinone, 4-tertiarybutyl catechol, para-hydroxydiphenylamine, and the like, and combinations thereof.

The process of this invention can be carried out in the presence of a solvent or a diluent which is nonreactive with either the reactants or the reaction products. Representative of commercially available nonreactive solvents that can be employed are the following: benzene, toluene, paraxylene, orthoxylene, metaxylene, ethylbenzene, diethyl ether, ethylpropyl ether, dibutyl ether, tetrahydrofuran, dioxane, cyclohexane, carbon tetrachloride, methylene chloride, and the like and mixtures thereof. Although a nonreactive solvent can be used, it is not necessary in the practice of this invention.

The olefin that can be employed in the process of this invention is any olefinic compound which contains at least one olefinic linkage having joined to one of the doubly bonded carbons a carbon atom containing at least one hydrogen atom attached thereto, and said doubly bonded carbons are free of cyano groups attached thereto. The essential part of these compounds which is necessary for reaction with an unsaturated mononitrile is represented by the formula:

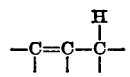

Specific examples of olefins that can be employed in the process of this invention include hydrocarbons such as propylene, isobutylene, 2-butene, 1-pentene, 1,5-hexadiene, cyclohexene, 1,5-cyclooctadiene, 2,4,4-trimethyl-1-pentene, alpha-methylstyrene, beta-methylstyrene, allylcyclohexene, allylbenzene, 1-decene, 1-dodencene; esters such as ethyl 5-methyl-5-hexenoate; alcohols such as methallyl alcohol; and aldehydes such as 5-methyl-5-hexenal, and the like. Preferred olefin reactants contain from 3 to 12 carbon atoms with from 1 to 2 ethylenically unsaturated, nonconjugated double bonds as the sole aliphatic unsaturation. Even more preferred olefin reactants are open chain monoolefinic hydrocarbons. Especially preferred are monoolefinic hydrocarbon reactants having from 3 to 12 carbon atoms and having an alkyl group, preferably methyl, as a side chain attached to at least one of the carbon atoms comprising the ethylenic linkage.

The unsaturated mononitrile that can be employed in the practice of this invention is any nitrile which contains ethylenic unsaturation, at least one hydrogen atom attached to a doubly bonded carbon atom, and at least one cyano group attached to a carbon atom adjacent and doubly bonded to a carbon atom containing at least one hydrogen atom. The unsaturated mononitrile can be represented by the formula

RCH=CR—CN wherein each R is the same or different and is independently selected from the group consisting of hydrogen, alkyl, cycloalkyl, and aryl hydrocarbyl radicals or combinations thereof. Preferably the total number of carbon atoms of an unsaturated mononitrile reactant is within the range of from 3 to 10, more preferably from 3 to 6. Examples of unsaturated mononitrile reactants are acrylonitrile, methacrylonitrile, 2-butenenitrile, 2-hexenenitrile, 2-decenenitrile, 5-methyl-2-hexenenitrile, 4-methyl-2-heptenenitrile, 3-cyclohexyl-2-propenenitrile, 4-phenyl-2-butenenitrile, 3(p-tolyl)-2-propenenitrile, and the like.

Any monoadduct reaction product of an olefin and an unsaturated mononitrile can be employed in the practice of this invention. The monoadduct reaction products of an olefin and an unsaturated mononitrile comprise 5-alkene-1-nitriles and 4-alkene-1-nitriles represented by the following general formulas:

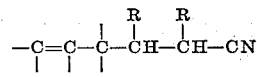

and

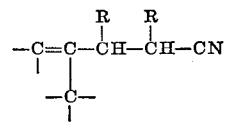

wherein each R is the same or different, and is independently selected from the group consisting of hydrogen, alkyl, cycloalkyl, and aryl hydrocarbyl radicals or combinations thereof. Preferably the total number of carbon atoms of the monoadduct reaction product is within the range of from 6 to 22, more preferably from 6 to 18. Monoadduct reaction products are exemplified by the following species: 5-methyl-5-hexenenitrile, 3,5-dimethyl-5-hexenenitrile, 3-(n-propyl)-5-hexenenitrile, 3-(n-propyl)-6-phenyl-5-hexenenitrile, 2,4-dimethyl-4-pentenenitrile, 2-ethyl-4-methyl-4-pentenenitrile, 2-(n-butyl)-4-pentenenitrile, and 2-(n-butyl)-5-phenyl-4-pentenenitrile.

The diadduct reaction products obtained by the process of this invention comprise the reaction product mixtures formed by the monoaddition of an unsaturated mononitrile and any monoadduct reaction product. Exemplary of a diadduct reaction product is the reaction product mixture consisting of the major isomer species 5-methylenenonanedinitrile and 5-methyl-4-nonenedinitrile, that contains minor isomer species 2-methyl-4-methyleneoctanedinitrile, 2,4 - dimethyl - 4-octenedinitrile, 2,4-dimethyl - 3-octenedinitrile, 2,6-dimethyl-4-methyleneheptanedinitrile and 2,4,6-trimethyl-3-heptenedinitrile.

This invention is further illustrated by the following examples which are intended to illustrate the best mode of practicing the invention without being unduly limitative.

EXAMPLE I

A process for the preparation of a diadduct reaction product comprising 5-methylene-1,9-nonanedinitrile was carried out accordingly: Acrylonitrile (212 g. containing 0.1 weight percent hydroquinone) was added to a 1-liter stainless steel autoclave. The autoclave was closed, purged of air with nitrogen, charged with isobutylene (112 g.) and heated under autogeneous pressure at 270° C. for 3 hours. Liquid products (210 g.) and insoluble polymeric solid products (approximately 90 g.) resulted. Analysis by gas-liquid chromatography indicated 100% conversion of acrylonitrile, a 32.0 percent ultimate yield of monoadduct reaction product (69.3 g.) comprising 5-methyl-5-hexenenitrile, and a 9.1 percent ultimate yield of a diadduct reaction product (29.4 g.) comprising 5-methylene-1,9-nonanedinitrile.

EXAMPLE II

A monoadduct reaction product comprising 5-methyl-5-hexenenitrile was prepared by the reaction of acrylonitrile and isobutylene in accordance with the following procedure: acrylonitrile (40 g. containing 0.1 weight percent hydroquinone), diphenylamine (80 g.) and benzene (200 g.) were charged to a 1-liter stainless steel autoclave. The autoclave was closed, purged of air with nitrogen and isobutylene (210 g.) was added. This mixture was stirred and maintained at 279° C. for 3 hours. Gas-liquid chromatographic analysis of the total product mixture indicated a 95% conversion of acrylonitrile. The reaction product mixture was concentrated on a rotary evaporator to afford 183 g. of product residue. GLC analysis of the residue indicated a 70.8 percent ultimate yield of 5-methyl-5-hexenenitrile (55.3 g.), a 4.95 percent ultimate yield of 2,4-dimethyl-4-pentenenitrile (3.9 g.) which represents a monoadduct reaction product ultimate yield of 75.8 percent.

EXAMPLE III

A diadduct reaction product comprising 5-methylene-1,9-nonanedinitrile was prepared according to the following procedure: acrylonitrile (80 g. containing 0.1 weight percent hydroquinone), triphenylphosphine (20 g.), monoadduct reaction product (168 g.) prepared in accordance with the procedure set out in Example II, and benzene (100 g.) were charged to a 1-liter stainless steel autoclave. The autoclave was closed, purged of air with nitrogen and pressurized to approximately 500 p.s.i.g. nitrogen. The mixture was stirred and maintained at 240° C. for 5 hours at approximately 2000 p.s.i.g. The reaction product mixture was cooled, vented, the solvent was removed on a rotary evaporator and the residue distilled through a Helipak column thus determining a 63.3 percent conversion of acrylonitrile, a 42.3 percent ultimate yield of 5-methylene-1,9-nonanedinitrile and a 3.4 percent ultimate yield of isomers thereof which represents a diadduct reaction product ultimate yield of 45.7 percent.

EXAMPLE IV

Diadduct reaction product comprising 5-methylene-1,9-nonanedinitrile was prepared in accordance with the practice of this invention accordingly: monoadduct reaction prouct (340 g.) prepared in accordance with the procedure described in Example II hereinbefore and acrylonitrile (110 g. containing 0.1 weight percent hydroquinone) were added to a 1-liter stainless steel autoclave. The autoclave was closed, purged of air with nitrogen and isobutylene (175 g.) was added. This mixture was stirred and maintained at 275° C. for 3 hours. The product mixture was cooled, vented, and distilled through a Helipak column. Analysis of the reaction product mixture indicated a 95.7 percent conversion of acrylonitrile, a 0.8 percent net gain in monoadduct reaction product comprising 5-methyl-5-hexenenitrile and a 68.7 percent ultimate yield of diadduct reaction product comprising 5-methylene-1,9-nonanedinitrile. No insoluble solid polymer by-product was observed.

EXAMPLE V

A series of six runs were carried out in the preparation of diadduct reaction product wherein acrylonitrile, isobutylene, and a monoadduct reaction product of acrylonitrile and isobutylene were contacted in accordance with the general procedure set out in Example IV. The ultimate yield of diadduct reaction product correlated with the reaction conditions of the various runs is summarized in Table I hereafter.

reaction product is neither depleted nor increased during the course of the reaction, the ultimate yield of diadduct reaction product is substantially improved in comparison to the yield of diadduct reaction product obtained under the reaction conditions employed in Examples I, II and III.

In a preferred embodiment of this invention, the process of this invention is carried out under continuous reaction conditions wherein monoadduct reaction product is neither depleted nor increased during the course of the reaction period.

Reasonable variations and modifications of the process of this invention will be apparent to those skilled in the art.

What is claimed is:

1. A process for the preparation of unsaturated dinitriles which comprises contacting under suitable reaction conditions an unsaturated mononitrile, an olefin, and a monoadduct reaction product of said olefin and said unsaturated nitrile to form an unsaturated dinitrile reaction product; said unsaturated mononitrile having from 3 to 10 carbon atoms per molecule and being represented by the formula

RCH=CR—CN wherein each R is independently selected from the group consisting of alkyl, cycloalkyl, and aryl hydrocarbyl radicals and combinations thereof and hydrogen; said olefin having from 3 to 12 carbon atoms per molecule and from 1 to 2 ethylenically unsaturated, nonconjugated double bonds as the sole aliphatic unsaturation and having joined to one of the ethylenically unsaturated double bonded carbon atoms a carbon atom having at least one hydrogen atom attached thereto, the double bonded carbon atoms of said olefin being free of cyano groups; wherein during substantially the entire reaction period the mole ratio of the monoadduct reaction product to said olefin is within the range of about 5 to 1 to about 0.2 to 1 and the mol ratio of the monoadduct reaction product to said unsaturated mononitrile is within the range of about 10 to 1 to about 0.2 to 1; and recovering from the resulting reaction effluent said unsaturated dinitrile reaction product.

2. A process in accordance with claim 1 wherein said reaction conditions comprise a temperature in the range of about 100 to about 500° C., a pressure in the range of 0 atmospheres to about 100,000 p.s.i.g., and a reaction time within the range of a few minutes to about 48 hours.

3. A process in accordance with claim 2 wherein said olefin is an open chain monoolefinic aliphatic hydrocarbon.

4. A process in accordance with claim 3 wherein during the entire reaction period said mol ratio of monoadduct reaction product to said olefin is maintained within the range of about 2 to 1 to about 0.5 to 1 and said mol ratio of monoadduct reaction product to said unsaturated

TABLE I

| | Mono-adduct, moles | Acrylo-nitrile, moles | Iso-butyl-ene, moles | IB¹/MA | Temp., °C. | Pressure, p.s.i.g. | | Time, hrs. | ACN conv., wt. percent² | Ultimate yields, mole percent³ | |
|---|---|---|---|---|---|---|---|---|---|---|---|
| | | | | | | Initial | Final | | | MA | DA |
| Run: | | | | | | | | | | | |
| 1 | 4.09 | 1.66 | 2.71 | 0.7 | 270 | 2,850 | 1,000 | 3 | 97 | −20 | 77 |
| 2 | 3.35 | 2.04 | 2.74 | 0.8 | 250 | 1,600 | 600 | 3 | 70 | −1 | 74 |
| 3 | 3.12 | 2.08 | 3.12 | 1.0 | 270 | 2,800 | 1,200 | 3 | 96 | 1 | 69 |
| 4 | 3.12 | 2.08 | 3.06 | 1.0 | 250 | 3,100 | 1,200 | 3 | 78 | 6 | 67 |
| 5 | 3.12 | 1.60 | 3.71 | 1.2 | 270 | 2,900 | 1,350 | 3 | 97 | 9 | 63 |
| 6 | 3.12 | 1.60 | 3.76 | 1.2 | 270 | 3,200 | 1,400 | 3 | 91 | 14 | 62 |

¹ Quotient: moles of isobutylene charged divided by moles of monoadduct charged.
² Conversion of acrylonitrile in weight percent.
³ No insoluble solid polymer by-product was observed.

As illustrated by the runs in Examples IV and V, under the reaction conditions employed, wherein monoadduct mononitrile is maintained within the range of about 5 to 1 to about 0.8 to 1.

5. A process in accordance with claim 4 wherein said reaction conditions comprise a temperature in the range of about 240 to about 350° C., a pressure in the range of about 500 to about 4000 p.s.i.g., and a reaction time in the range of about 1 to about 5 hours.

6. A process in accordance with claim 5 wherein said unsaturated mononitrile is acrylonitrile.

7. A process in accordance with claim 6 wherein said olefin is isobutylene.

8. A process in accordance with claim 7 wherein the monoadduct reaction product content of the reaction media remains substantially unchanged during the entire reaction period.

9. A process in accordance with claim 2 wherein said unsaturated mononitrile is acrylonitrile.

10. A process in accordance with claim 9 wherein said olefin is isobutylene.

References Cited

UNITED STATES PATENTS

| | | | |
|---|---|---|---|
| 2,232,785 | 2/1941 | Howk | 260—465.9 |
| 2,641,607 | 6/1953 | Albisetti, Jr. et al. | 260—465.9 X |
| 3,595,901 | 7/1971 | Smith | 260—465.9 |
| 2,773,089 | 12/1956 | Anderson | 260—465.9 X |
| 2,741,631 | 4/1956 | Sauer | 260—465.9 X |
| 2,964,505 | 12/1960 | Drysdale | 260—465.9 X |

OTHER REFERENCES

Albisetti, et al. J.A.C.S., 78 (1956) pp. 2637–2641.

JOSEPH PAUL BRUST, Primary Examiner

U.S. Cl. X.R.

260—464, 465 H, 465 K, 465.3, 465.4, 465.6, 465.8 D, 465.9